March 14, 1950     F. KERELUCK     2,500,611

COMBINATION JUICE EXTRACTOR AND LIQUID CONTAINER

Filed Feb. 17, 1947

INVENTOR.
FRED KERELUCK
BY *Zoltan H. Holecek*
ATTORNEY

Patented Mar. 14, 1950

2,500,611

UNITED STATES PATENT OFFICE 2,500,611

COMBINATION JUICE EXTRACTOR AND LIQUID CONTAINER

Fred Kereluck, Bronx, N. Y.

Application February 17, 1947, Serial No. 729,052

1 Claim. (Cl. 146—3)

This invention relates to a combined squeezer and beverage shaker.

It is an object of the present invention to provide in a combined juice squeezer and beverage shaker parts detachable from the main body of the shaker and adapted to fit either in one direction or in an inverted direction as when the squeezer is being used and wherein there are projected parts extending from the outer periphery of the squeezer portion such that liquid can be confined to a central area when being either extracted from the fruit or when the parts are arranged to effect a pouring of the contents of the shaker.

According to the invention, the squeezer part is made integral with the main cover part. There are extended portions adapted to deflect the liquid passing through the squeezer element toward the center of the shaker and wherein this portion may serve when the cover part is in position with the squeezer being inverted downwardly to provide the pouring outlet for the shaker.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Figure 1:
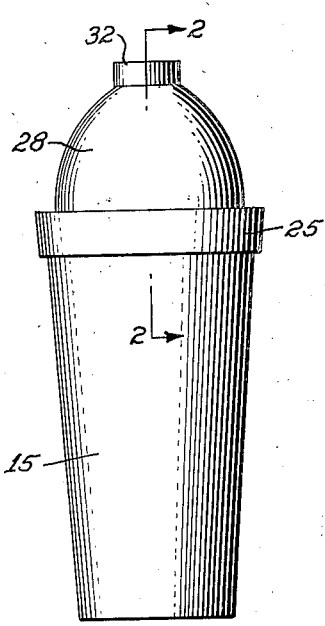
Fig. 1 is a side elevational view of the combined squeezer and beverage shaker constructed in accordance with the present invention.

The combined squeezer and beverage shaker, according to the present invention, includes a container 15 having an open top. A one-piece squeezer is provided for closing the open top of the container 15.

The one-piece squeezer comprises a flat top wall portion 16 disposed above the open top of the container 15 and formed with a concentric downwardly extending squeezer portion 24. The top wall portion 16 is formed with a circular row of holes 19 about the squeezer portion 24. The top wall portion 16 continues at its outer periphery into a downwardly and outwardly flared intermediate wall portion 17.

The intermediate wall portion 17 in turn continues into a horizontal outwardly directed flange portion 18 which rests on the top edge of the container 15. The flange portion 18 continues at its outer periphery into a depending skirt portion 25 which surrounds the top of the container 15, when the one-piece squeezer is in the position shown in Figs. 1 and 2, holding the squeezer in its position closing the top of the container 15.

The flat top wall portion 16 is formed, between the circular row of holes 19 and its peripheral edge, with an upstanding circular wall portion 26 formed with external threads. A cover 28 is engaged over the one-piece squeezer with its bottom edge resting on the top face of the flange portion 18. Internally the cover 28 is formed with a circular inwardly directed boss 27, see Fig. 2, which rests on the top face of the top wall portion 16 and surrounds the circular wall portion 26. The boss 27 is formed with threads which threadedly engage the threads of the wall portion 26 removably retaining the cover 28 in position.

The cover 28 is formed with an upstanding pouring nozzle 31 closed by a removable cap 32.

Figure 2:
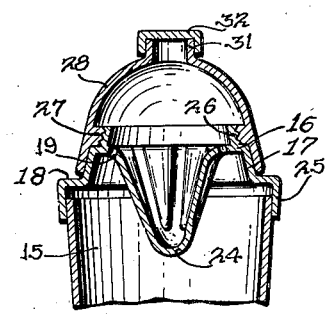
Fig. 2 is a partial vertical sectional view taken on the line 2—2 of Fig. 1.
Figure 3:
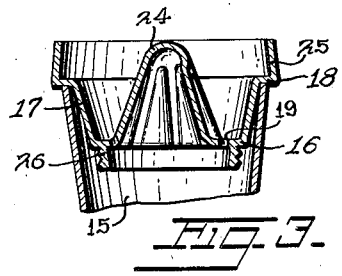
Fig. 3 is a view similar to Fig. 2, but showing the parts inverted for use as a squeezer.

The operation of the combined squeezer and beverage shaker is as follows:

With the article completely assembled as shown in Figs. 1 and 2 it can be conveniently used for shaking any mixed drink. When it is desired to pour the contents of the container 15, it is merely necessary to remove the cap 32 and invert the container 15 so that the liquid will pour through the nozzle 31. When it is desired to use the one-piece squeezer to obtain the juice from a citrus fruit, it is merely necessary to unscrew the cover 28 and invert the one-piece squeezer so that the flange portion 18 rests on the top of the container 15. The squeezer portion 24 will then be directed upward, as shown in Fig. 3, to be used in the usual manner so that the filtered juice will pass into the container 15 through the circular row of holes 19.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

In an article of the class described having a container formed with an open top, a one-piece squeezer engaged over the open top of the container, comprising a flat top wall portion disposed above the open top of the container and formed with a concentric downwardly extending squeezer portion, said top wall portion being formed with a circular row of holes about said squeezer portion, said top wall portion continuing at its outer periphery into a downwardly and outwardly flared intermediate wall portion, said intermediate wall portion continuing into a horizontal outwardly directed flange portion resting on the top edge of the container, said flange portion continuing at its outer periphery into a depending skirt portion surrounding the top of the container, said flat top wall portion being formed between said circular row of holes and its peripheral edge with an upstanding circular wall portion formed externally with threads, a cover engaged over said squeezer with its bottom portion encircling said intermediate wall portion and its bottom edge resting on the top face of said flange portion, a circular inwardly directed boss formed within said cover and resting on the top face of said top wall portion and surrounding said circular wall portion, threads formed on the inner peripheral edge of said boss and engaging the threads of said circular wall portion removably retaining said cover in position on said squeezer, a concentric upstanding nozzle formed on the top of said cover, and a cap removably positioned over said nozzle.

FRED KERELUCK.

REFERENCES CITED

The following references are of record in the file of this patent:

UNITED STATES PATENTS

| Number | Name | Date |
| --- | --- | --- |
| 1,075,119 | Reichner | Oct. 7, 1913 |
| 1,290,262 | Lyttle | Jan. 7, 1919 |
| 1,509,981 | Rice | Sept. 30, 1924 |
| 1,585,524 | Bass | May 18, 1926 |
| 1,661,336 | Katz | Mar. 6, 1928 |
| 1,748,483 | Hyde | Feb. 25, 1930 |